United States Patent
Evrard et al.

(10) Patent No.: US 10,802,593 B2
(45) Date of Patent: Oct. 13, 2020

(54) DEVICE AND METHOD FOR RECOGNIZING GESTURES FOR A USER CONTROL INTERFACE

(71) Applicant: SAGEMCOM BROADBAND SAS, Rueil-Malmaison (FR)

(72) Inventors: Etienne Evrard, Rueil-Malmaison (FR); Frédéric Colinet, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 933 days.

(21) Appl. No.: 14/650,587

(22) PCT Filed: Dec. 9, 2013

(86) PCT No.: PCT/EP2013/075984
§ 371 (c)(1),
(2) Date: Jun. 9, 2015

(87) PCT Pub. No.: WO2014/090754
PCT Pub. Date: Jun. 19, 2014

(65) Prior Publication Data
US 2015/0370332 A1    Dec. 24, 2015

(30) Foreign Application Priority Data
Dec. 12, 2012   (FR) ..................... 12 61939

(51) Int. Cl.
*G06F 3/0481*    (2013.01)
*G06F 3/0482*    (2013.01)
(Continued)

(52) U.S. Cl.
CPC ............ *G06F 3/017* (2013.01); *G06F 3/0346* (2013.01); *G06N 3/08* (2013.01)

(58) Field of Classification Search
CPC .... G06F 3/0481; G06F 3/0482; G06F 3/0483; G06F 9/4443; G06F 8/34; G06F 17/279;
(Continued)

(56) References Cited

U.S. PATENT DOCUMENTS 5,594,469 A * 1/1997 Freeman .................. G06F 3/017
                                                          345/158
6,128,003 A * 10/2000 Smith ................ G06K 9/00355
                                                          345/156

(Continued)

OTHER PUBLICATIONS

Wikipedia, Feature Scaling, Mar. 6, 2012, Wikipedia, pp. 1-2.*
Feb. 20, 2014 Search Report issued in International Application No. PCT/EP2013/075984.

*Primary Examiner* — Arpan P. Savla
*Assistant Examiner* — Erik V Stitt
(74) *Attorney, Agent, or Firm* — Oliff PLC; R. Brian Drozd

(57) ABSTRACT

In the context of a user interface control, a gesture-recognition device: receives gyroscopic data representing a gesture executed with a dedicated instrument including a gyroscopic sensor; determines a correlation between the received gyroscopic data and gyroscopic data relating to a supervised learning and pre-recorded into a database; recognizes or not the executed gesture according to said correlation, the only data representing the executed gesture taken into account being said gyroscopic data; transposes each recognized gesture into a user interface command.

9 Claims, 2 Drawing Sheets

Figure 1:
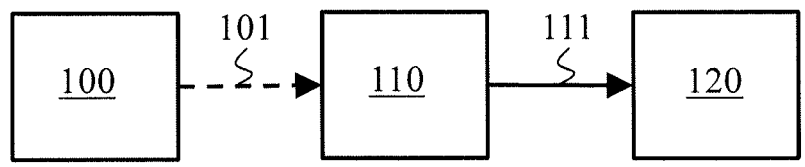

(51) Int. Cl.
*G06F 3/01* (2006.01)
*G06F 3/0346* (2013.01)
*G06N 3/08* (2006.01)

(58) Field of Classification Search
CPC ..... G06F 3/017; G06F 3/0346; G06Q 10/107; G06N 3/08
See application file for complete search history.

(56) References Cited

U.S. PATENT DOCUMENTS

| | | | | |
|---|---|---|---|---|
| 8,448,083 | B1* | 5/2013 | Migos | G06F 3/04883 345/671 |
| 9,261,979 | B2* | 2/2016 | Shamaie | G06F 3/0346 |
| 9,785,335 | B2* | 10/2017 | Oh | G06F 3/0488 |
| 2003/0076293 | A1* | 4/2003 | Mattsson | G06F 3/017 345/156 |
| 2004/0001113 | A1* | 1/2004 | Zipperer | G06F 3/017 715/853 |
| 2008/0294656 | A1* | 11/2008 | Bhat | G06F 16/90344 |
| 2011/0185321 | A1* | 7/2011 | Capela | G06F 3/0488 715/863 |
| 2012/0007713 | A1* | 1/2012 | Nasiri | G06F 1/1694 340/5.81 |
| 2012/0054620 | A1 | 3/2012 | Tilley et al. | |
| 2012/0131513 | A1* | 5/2012 | Ansell | G06F 3/04883 715/863 |
| 2012/0135805 | A1* | 5/2012 | Miller, IV | G06F 3/017 463/36 |
| 2012/0272194 | A1 | 10/2012 | Yang et al. | |
| 2014/0325459 | A1* | 10/2014 | Kela | G06F 1/1626 715/863 |
| 2016/0062472 | A1* | 3/2016 | Lin | G06F 3/0425 348/222.1 |

* cited by examiner

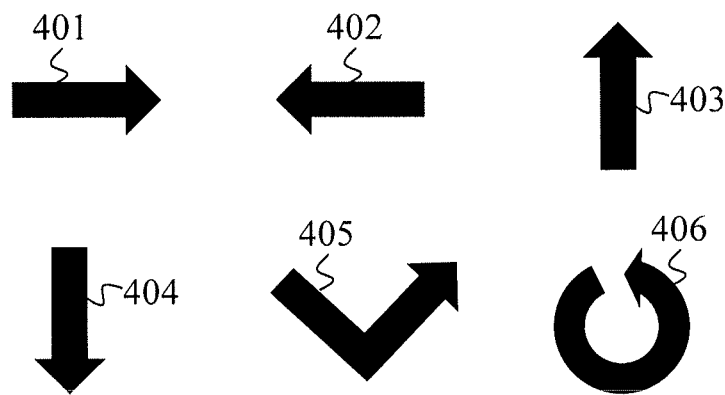
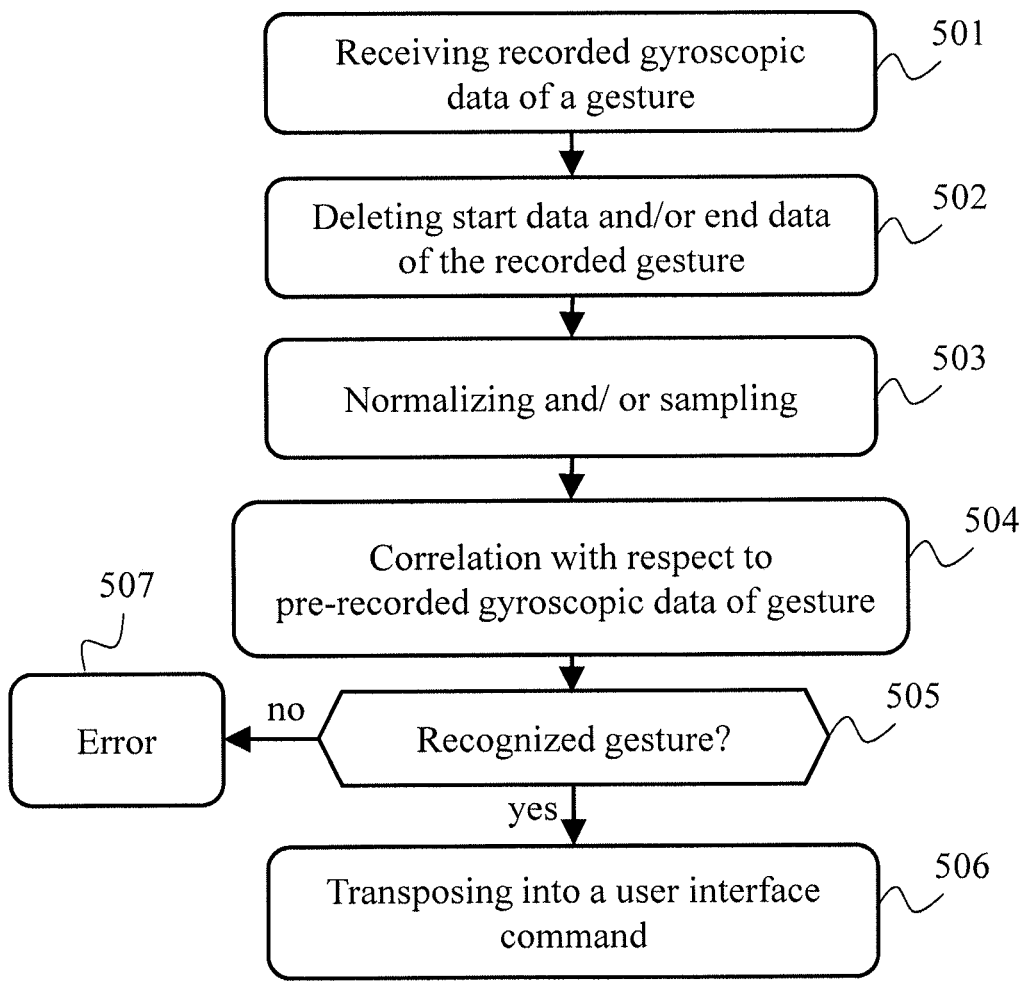
Fig. 4
Fig. 5 form factor 1
DEVICE AND METHOD FOR RECOGNIZING GESTURES FOR A USER CONTROL INTERFACE The present invention concerns a recognition of gestures in the context of a user interface control.

Interaction with a user interface of a device, in particular a graphical interface, typically takes place with a remote control or a joystick. Such a remote control or joystick has push buttons intended to send specific commands and in particular for navigating in the graphical interface or for the validation or cancellation of actions via the graphical interface. Such remote controls or joysticks are sometimes provided with gyroscopes and accelerometers enabling a user to make gestures with the remote control in his hand and thus to control the user interface of the device. Interaction between the user and the user interface is improved thereby.

Systems allowing control by gestures are based on a transformation of data collected thanks to the gyroscope and accelerometer of the remote control into a pointing system that would describe a trace on a screen, that is to say passing from six inertial coordinates (orientation of the gyroscope on three axes and acceleration on three axes) to Cartesian coordinates on a plane. However, it is not sufficient to integrate the acceleration data twice in order to obtain the position of the remote control, so as to make a correct pointing system from it. It is also necessary to consider the rotations of the remote control and to transpose the calculated position into a reference frame of the world of the user. Establishing this reference frame of the world of the user is a strong constraint that involves a calibration phase and constantly measuring the data from the gyroscope and accelerometer in order to determine at each instant the orientation of the coordinate system of the remote control and thus obtain valid smooth measurements without unpleasant jumps of the pointer. This approach implies a processing latency that is perceptible to the user and a high hardware cost, and doing without the definition of a reference frame in the world of the user would cause a drift in the pointing system.

It is desirable to overcome these drawbacks of the prior art by providing a solution that enables dispensing with defining a reference frame in the world of the user in the context of a control by gestures of a user interface of a device. It is in particular desirable to provide such a solution that is suitable for navigating in a graphical interface.

It is also desirable to provide a solution that is simple to implement and at low cost.

The invention concerns a method for recognizing gestures in the context of a user interface control, said method being implemented by a gesture-recognition device, the method comprising a step of receiving gyroscopic data representing a gesture executed with a dedicated instrument comprising a gyroscopic sensor. The method is such that it further comprises the following steps: determining a correlation between the received gyroscopic data and gyroscopic data relating to a supervised learning pre-recorded in a database; recognizing or not the executed gesture according to said correlation, the only data representing the executed gesture taken into account being said gyroscopic data; transposing each recognized gesture into a user-interface command. Thus, by seeking to recognize the executed gesture only from gyroscopic data, the invention avoids defining a reference frame in the world of the user and dispenses with a representation of the trace of the gesture on a plane, which considerably reduces the complexity of implementation of the recognition of gestures and increases accordingly the reactivity of the control of the user interface.

According to a particular embodiment, the received gyroscopic data representing measurements made by the gyroscopic sensor between two actions detected on a button of said dedicated instrument, the step of receiving gyroscopic data is followed by a step of deleting a predefined number of gyroscopic data from the start of the measurements and/or a predefined number of gyroscopic data to the end of the measurements.

According to a particular embodiment, the gesture-recognition device comprising a network of artificial neurons comprising output neurons associated respectively with the gestures that said device is able to recognize, the step of determining the correlation is performed by the network of artificial neurons.

According to a particular embodiment, the network of artificial neurons implements an activation function of the sigmoid type and, for the received gyroscopic data and for each output neuron, supplies a probability that said received gyroscopic data correspond to the gesture associated with said output neuron.

According to a particular embodiment, the method comprises a step of sampling by equally distributed deletion or equally distributed preservation of gyroscopic data among the received gyroscopic data.

According to a particular embodiment, the gyroscopic data relating to the supervised learning pre-recorded in the database correspond to all the following gestures: a horizontal gesture to the right; a horizontal gesture to the left; a vertical gesture upwards; a vertical gesture downwards.

According to a particular embodiment, the received gyroscopic data representing measurements made by the gyroscopic sensor on three axes of an inertial reference frame, the method comprises a step of normalizing the received gyroscopic data so that: for each original gyroscopic data item defined with respect to a given axis, the normalized gyroscopic data item is equal to said original gyroscopic data item minus the minimum value of all the original gyroscopic data defined with respect to said given axis, the whole divided by the minimum value of all the original gyroscopic data defined with respect to said given axis minus the minimum value of all the original gyroscopic data defined with respect to said given axis.

According to a particular embodiment, the set of gestures further comprises: a gesture corresponding to the reproduction of the letter "V"; a circular gesture starting from a high position and beginning the rotation towards the left.

According to a particular embodiment, the gyroscopic data received representing measurements made by the gyroscopic sensor on three axes of an inertial reference frame, the method comprises a step of normalizing the received gyroscopic data so that: for each original gyroscopic data item defined with respect to a given axis, the normalized gyroscopic data item is equal to said original gyroscopic data item minus the mean of all the original gyroscopic data defined with respect to said given axis, the whole divided by the standard deviation of all the original gyroscopic data defined with respect to said given axis.

The invention also concerns a gesture-recognition device comprising means for receiving gyroscopic data representing a gesture executed with a dedicated instrument comprising a gyroscopic sensor. The device is such that it further comprises: means for determining a correlation between the received gyroscopic data and gyroscopic data relating to a supervised learning pre-recorded in a database; means for recognizing or not the executed gesture according to said correlation, the only data representing the executed gesture taken into account being said gyroscopic data; means for transposing each recognized gesture into a user interface command.

The invention also concerns a computer program, which may be stored on a medium and/or downloaded from a communication network in order to be read by a processor. This computer program comprises instructions for implementing the method mentioned above in any of its variants when said program is executed by the processor. The invention also concerns storage means comprising such a computer program.

Figure 2:
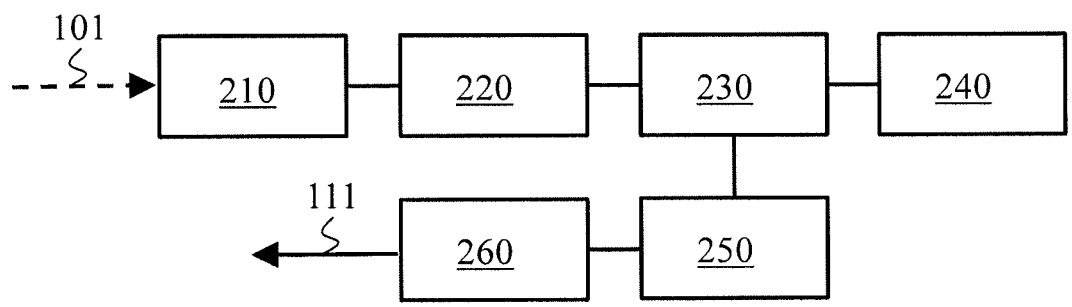
Figure 3:
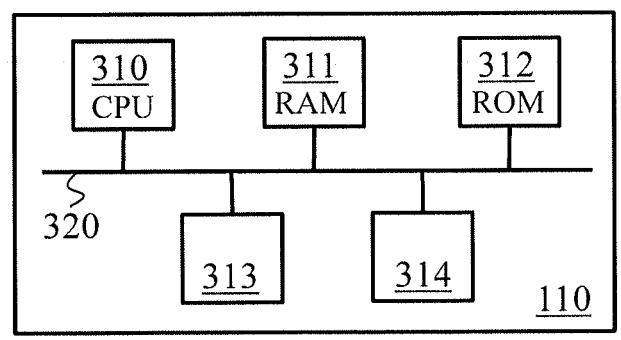

The features of the invention mentioned above, as well as others, will emerge more clearly from a reading of the following description of an example embodiment, said description being given in relation to the accompanying drawings, among which:

FIG. 1 schematically illustrates a system in which the present invention may be implemented;

FIG. 2 schematically illustrates an example of modular division of at least part of the gesture-recognition device;

FIG. 3 schematically illustrates an example of hardware architecture of a gesture-recognition device of the communication system;

FIG. 4 schematically illustrates a set of gestures to be recognized;

FIG. 5 schematically illustrates a gesture-recognition algorithm.

FIG. 1 schematically illustrates a system in which the present invention may be implemented.

The system of FIG. 1 comprises a remote control 100, sometimes also referred to as a joystick, provided with a gyroscopic sensor for collecting gyroscopic data with regard to the angular position of the remote control 100 on three axes of its reference frame with respect to an inertial reference frame. The gyroscopic data thus represent movements made on the remote control 100 by a user, meaning gestures made by the user of the remote control 100 in his hand. In general terms, the remote control 100 is a dedicated instrument comprising a gyroscopic sensor adapted for supplying gyroscopic data representing gestures made with the dedicated instrument.

The remote control 100 may thus comprise an accelerometer, meaning a sensor adapted for collecting linear acceleration data on the movements made on the remote control 100 by the user. As will be seen hereinafter, only the gyroscopic data are used to perform recognition of movements. It is however possible to use, in the system of FIG. 1, a remote control, available off the shelf, having an accelerometer and a gyroscope, and to perform recognition of gestures only on measurements made thanks to the gyroscope.

The system of FIG. 1 further comprises a gesture-recognition device 110. An example of modular division of at least part of the gesture-recognition device 110 is detailed below in relation to FIG. 2, and the operation of the gesture-recognition device 110 is detailed below in relation to FIG. 5. The gesture-recognition device 110 may be integrated in a set-top box or any other apparatus that one wishes to control thanks to gestures.

The remote control 100 and the gesture-recognition device 110 are interconnected by a first link 101. The first link 101 is preferably a wireless link, but in a variant may be a wired link. The first link 101 is adapted for enabling the remote control 100 to transmit at least the gyroscopic data to the gesture-recognition device 110. The gyroscopic data are supplied in the form of samples corresponding respectively to measurements at regular intervals of the gyroscopic sensor on the three axes of the inertial reference frame.

The system of FIG. 1 further comprises a screen 120 connected to the gesture-recognition device 110 by a second link 111. For example, the second link 111 is of the HDMI (high-definition multimedia interface) type. The screen 120 is then adapted for displaying a graphical user interface GUI according to the data transmitted by the gesture-recognition device 110 via the second link 111. The graphical interface GUI is then controlled by the user thanks to gestures made by the remote control 100 in his/her hand by virtue of the gesture-recognition device 110.

The remote control 100 preferably comprises a control button, such as a push button or a pressure sensor adapted for detecting the pressure exerted by the finger of the user on the sensor. The user then performs a first action on the button in order to indicate the start of a gesture controlling the graphical interface GUI in a second action on the button in order to indicate the end of the command gesture on the graphical interface GUI. For example, the first action is a pressing on the button followed by a release of the button, and the second action is a consecutive pressing on the button followed by a release of the button. According to another example, the first action is a pressing on the button and the second action is a release of the button, the pressing on the button being maintained during the execution of the gesture. These actions then delimit the gesture to be recognized by the gesture-recognition device 110. Either the remote control 100 transmits the gyroscopic data relating to any movement made with the remote control 100 as well as indications representing actions performed on the button so that the gesture-recognition device 110 can delimit the gyroscopic data relating to gestures to be recognized from all the gestures made by the user on the remote control in his hand, or the remote control 100 transmits the gyroscopic data relating to any movement made with the remote control between an action on the button marking the start of a gesture to be recognized and a corresponding action on the button marking the end of a gesture to be recognized.

To make it possible to navigate in the graphical interface GUI, few gestures having to be recognized by the gesture-recognition device 110 are necessary. One example of such gestures is described below in relation to FIG. 4.

FIG. 2 schematically illustrates an example of modular division of at least part of the gesture-recognition device 110. This modular division may correspond to a hardware implementation, for example thanks to FPGA (field-programmable gate array) or ASIC (application-specific integrated circuit) components, or a software architecture.

The gesture-recognition device 110 comprises a module 210 for receiving signals via the first link 101, the received signals transporting the gyroscopic data representing gestures made by the user with his remote control 100 in his hand. As already mentioned, the received signals may also transport indications representing actions made on a button of the remote control 100. The signal-reception module 210 is then responsible for sorting the data received via said signals and extracting the gyroscopic data on the basis of which the gesture-recognition device 110 must recognize gestures.

The gesture-recognition device 110 preferably comprises a module 220 for normalizing and sampling the gyroscopic data on the basis of which the gesture-recognition device 110 must recognize gestures. The behavior of the normalization and sampling module 220 is described below in relation to FIG. 5.

The gesture-recognition device 110 further comprises a database 240 storing gyroscopic data representing movements of the remote control 100 corresponding to the gestures to be recognized. The gyroscopic data pre-recorded in the database 240 result from a supervised learning of the gestures to be recognized. The gesture-recognition device 110 further comprises a module 230 for determining correlation between the gyroscopic data supplied by the signal-reception module 210 and gyroscopic data obtained by supervised learning, meaning those stored in the database 240.

According to a preferred embodiment, the module 230 for determining correlation is a network of artificial neurons. The network of artificial neurons comprises a number of output neurons equal to the number of gestures that the gesture-recognition device 110 must be capable of recognizing. The number of input neurons is equal to the number of samples of gyroscopic data to be taken into consideration for recognizing the gesture executed by the user multiplied by the number of axes of the inertial reference frame (one gyroscopic data item for each of the three axes of the inertial reference frame), the samples of a gesture being injected into the respective input neurons. The network of artificial neurons comprises a number of input neurons and a number of intermediate layers, also referred to as hidden layers, defined empirically. The network of artificial neurons implements an activation function of the sigmoid type, enabling, for each of the output neurons, to supply a probability that the associated gesture is the one that corresponds to the gyroscopic data supplied to the input neurons. When one of these probabilities is higher than a predefined threshold, the corresponding gesture is considered to be recognized.

In the context of a software implementation, the network of artificial neurons may be implemented thanks to the FANN (Fast Artificial Neural Network) library created by Steffen Nissen.

According to another embodiment, the module 230 for determining correlation is a support vector machine SVM, also referred to as a wide-margin separator. As with the network of artificial neurons, the support vector machine SVM is based on a supervised learning and enables solving discrimination and classification problems.

The database 240 is constructed by learning. This can be done in the laboratory upstream of the manufacture of the gesture-recognition device 110. A panel of users then executes, thanks to the remote control 100, the gestures to be recognized so as to populate the database 240 with gyroscopic data corresponding to these gestures. Populating the database 240 with gyroscopic data resulting from gestures executed several times by various users increases the reliability of the gesture recognition. Indeed, the same gesture may be executed in different ways by different people and even by the same person.

The gesture recognition device 110 further comprises a module 250 for transposing into user interface commands. The module 250 for transposing into user interface commands is adapted for receiving, from the module 230 for determining correlation, an indication of a gesture recognized from gyroscopic data received from the remote control 100. The module 250 for transposing into user interface commands is adapted for transposing the recognized-gesture indication into a corresponding user interface command.

The gesture-recognition device 110 further comprises a user interface management module 260. The user interface management module 260 is adapted for receiving, coming from the transposition module 250, user interface commands. The user interface management module 260 is responsible for applying to the user interface the command resulting from the gesture executed by the user and recognized by the gesture-recognition device 110. In the context of navigating in a graphical interface GUI, the user interface management module 260 is responsible for moving a cursor and optionally making validations and deletions according to the gestures executed by the user and recognized by the gesture-recognition device 110. The user interface management module 260 therefore adapts the rendition of the graphical interface GUI and transmits, via the second link 111, data representing the change in rendition of the graphical interface GUI so that the display by the screen 120 is updated accordingly.

When the graphical interface GUI is based on a use of a web browser, the module 250 for transposing into user interface commands preferably represents the recognized gesture as characters corresponding to computer keyboard keys.

FIG. 3 schematically illustrates an example of hardware architecture of the gesture-recognition device 110.

The gesture-recognition device 110 then comprises, connected by a communication bus 320: a processor or CPU (Central Processing Unit) 310; a random access memory RAM 311; a read-only memory ROM 312; a storage unit or a storage medium reader, such as an SD (secure digital) card reader or a hard disk drive HDD 313; and a set of interfaces 314 for receiving data via the first link 101 and transmitting data via the second link 111.

The processor 310 is capable of executing instructions loaded into the RAM 311 from the ROM 312, from an external memory (not shown), from a storage medium, or from a communication network. When the gesture-recognition device 110 is powered up, the processor 310 is capable of reading instructions from the RAM 311 and executing them. These instructions form a computer program causing the processor 310 to implement all or some of the modules already described in relation to FIG. 2, as well as algorithms and steps described below.

Thus all or some of these modules, algorithms and steps may be implemented in software form by execution of a set of instructions by a programmable machine, such as a DSP (digital signal processor) or a microcontroller. All or some of the modules, algorithms and steps may also be implemented in hardware form by a machine or dedicated component such as an FPGA or an ASIC.

FIG. 4 schematically illustrates a set of gestures to be recognized, particularly suited to navigating in a graphical interface GUI. The gyroscopic data resulting from the supervised learning of these gestures are stored in the database 240 and the user can control the user interface by executing these gestures with the remote control 100.

A first gesture 401 corresponds to the horizontal movement of the remote control 100 to the right. The first gesture 401 is particularly suited to moving a cursor to the right in a graphical interface GUI.

A second gesture 402 corresponds to a horizontal movement of the remote control 100 to the left. The second gesture 402 is particularly suited to moving the cursor to the left in the graphical interface GUI.

A third gesture 403 corresponds to the vertical movement of the remote control 100 upwards. The third gesture 403 is particularly suited to moving the cursor upwards in the graphical interface GUI.

A fourth gesture 404 corresponds to the vertical movement of the remote control 100 downwards. The fourth gesture 403 is particularly suited to moving cursor downwards in the graphical interface GUI.

Thus, when the gesture recognition device 110 is adapted for recognizing at least the first 401, second 402, third 403 and fourth 404 gestures, it is then easy for the user to move a cursor in a graphical interface GUI.

The assembly formed by the first 401, second 402, third 403 and fourth 404 gestures may be augmented by a fifth gesture 405. The fifth gesture 405 corresponds to the reproduction of the letter "V" thanks to the remote control, which corresponds to a tick. The fifth gesture 405 is particularly suited to a validation action in the graphical interface GUI.

The assembly formed by the first 401, second 402, third 403 and fourth 404 gestures, and optionally the fifth gesture 405, may be augmented by a sixth gesture 406. The sixth gesture 406 corresponds to the circular movement of the remote control 100, starting from a high position and beginning the rotation towards the left. The sixth gesture 406 is particularly suited to a deletion action in the graphical interface GUI.

The first 401, second 402, third 403, fourth 404, fifth 405 and sixth 406 gestures described above implies gyroscopic data that are sufficiently distinct to enable the network of artificial neurons or the support vector machine SVM to make a classification without having recourse to acceleration data.

All the gestures that the gesture-recognition device 110 is adapted for recognizing may be enhanced by other gestures. All the gestures that the gesture-recognition device 110 is adapted to recognize may be composed of any other set of gestures, or a set of gestures comprising a subset of gestures described above, optionally augmented with other gestures.

FIG. 5 schematically illustrates a gesture-recognition algorithm used by the gesture recognition device 110.

In a step 501, the gesture-recognition device 110 receives gyroscopic data of a gesture recorded by the remote control 100.

In a following step 502, preferably, the gesture-recognition device 110 deletes the start and/or end data of the gesture recorded. Indeed, when the user makes the gesture to be recognized, the path of the remote control may not be stable at the start and/or end of the gesture. This depends on whether the user performs the action on the button in order to indicate the start of the gesture before or after having actually started the gesture, and whether the user performs the action on the button to indicate the end of the gesture before or after actually having ended the gesture. To do this, when the gyroscopic data are received in the form of successive frames, each including a sample of gyroscopic data, the gesture-recognition device 110 deletes a predefined number N1 of start frames and/or a predefined number N2 of end frames, whether or not N1 is equal to N2. The numbers N1 and N2 are defined empirically.

In a following step 503, preferably when the gesture-recognition device 110 comprises the network of artificial neurons, the gesture-recognition device 110 performs a step of normalizing the gyroscopic data. This enables the network of artificial neurons not to fall into a local minimum, by transferring the gyroscopic data into a field of values that is denser than the original.

According to a first embodiment, the normalization of the data is performed thanks to the following formula:

$$z_1^i = \frac{x_i - \min(X)}{\max(X) - \min(X)}$$

where:
- $x_i$ represents each gyroscopic data item on each of the aforementioned three axes;
- $z_1^i$ represents the result of the normalization of the data item $x_i$ according to the first embodiment;
- $\min(X)$ represents the minimum value of the population, for the gesture to be recognized, of gyroscopic data on the axis to which $x_i$ relates; and
- $\max(X)$ represents the maximum value of the population, for the gesture to be recognized, of gyroscopic data on the axis to which $x_i$ relates.

In other words, for an original gyroscopic data item obtained with respect to a given axis, the normalized gyroscopic data item is equal to the original gyroscopic data item minus the minimum value of all the original gyroscopic data items obtained with respect to said given axis, the whole divided by the minimum value of all the original gyroscopic data obtained with respect to said given axis minus the minimum value of all the original gyroscopic data obtained with respect to said given axis.

The normalization applied in the context of the first embodiment is particularly suited to the discrimination of the first 401, second 402, third 403 and fourth 404 gestures, meaning those relating to moving the cursor in the graphical interface GUI.

According to a second embodiment, the normalization of the data is done thanks to the following formula:

$$z_2^i = \frac{x_i - \overline{X}}{\sigma_X}$$

where:
- $z_2^i$ represents the result of the normalization of the data item $x_i$ according to the second embodiment;
- $\overline{X}$ represents the mean value of the population, for the gesture to be recognized, of gyroscopic data on the axis to which $x_i$ relates;
- $\sigma_x$ represents the standard deviation of the population, for the gesture to be recognized, of gyroscopic data on the axis to which $x_i$ relates.

In other words, for an original gyroscopic data obtained with respect to a given axis, the normalized gyroscopic data item is equal to the original gyroscopic data item minus the mean of all the original gyroscopic data obtained with respect to said given axis, the whole divided by the standard deviation of all the original gyroscopic data obtained with respect to said given axis.

The normalization applied in the context of the second embodiment is generally referred to as a centring and reduction operation. It is more efficient than the one of the first embodiment since it is less sensitive to the extreme values.

The normalization applied in the context of the second embodiment is particularly suited to the discrimination of the first 401, second 402, third 403, fourth 404, fifth 405 and sixth 406 gestures, that is to say those relating to the cursor movement, to validation and to deletion in the graphical interface GUI.

The normalization makes a change of unit for making the field of values more dense, without any effect on the variation profiles, meaning the variations in the original gyroscopic data are found again in the normalized gyroscopic data. In addition, the correlation between original gyroscopic data is preserved in the field of values of the normalized gyroscopic data.

In the step 503, preferably when the gesture-recognition device 110 comprises the network of artificial neurons, the gesture-recognition device 110 performs a step of sampling the gyroscopic data. This sampling step may be implemented before or after the normalization step, preferably before. The sampling step consists of keeping only a number of gyroscopic data equal to the number of input neurons of the network of artificial neurons. For example, the sampling may be implemented by deletion equally distributed over all the gyroscopic data for the gesture in question, or by equally distributed preservation over the whole of the gyroscopic data for the gesture in question.

In a following step 504, the gesture-recognition device 110 determines a correlation between the gyroscopic data, optionally normalized and/or sampled, received from the remote control 100 and the gyroscopic data resulting from the supervised learning. In other words, according to the embodiments previously described, the gesture-recognition device 110 injects into the network of artificial neurons or into the support vector machine SVM the gyroscopic data, optionally normalized and/or sampled, received from the remote control 100. Thus the only data representing the executed gesture taken into account are said gyroscopic data. Indeed, it has been found that, for many gestures and particularly for the gestures depicted schematically in FIG. 4, acceleration data would not be discriminating. The invention thus enables avoiding defining a reference frame in the world of the user and dispensing with a representation of the trace of the gesture on a plane, which considerably reduces the complexity of implementation of the recognition of gestures and increases accordingly the reactivity of the control of the user interface.

In a following step 505, the gesture-recognition device 110 determines whether the gesture executed by the user is recognized. If such is the case, a step 506 is performed; otherwise a step 507 is performed. In the case of the network of artificial neurons, the gesture recognition device 110 determines whether one of the probabilities supplied by the output neurons is above a predefined threshold. If such is the case, the gesture represented by the output neuron in question is recognized.

In the step 506, the gesture-recognition device 110 transposes the recognized gesture into a command controlling the user interface, such as for example a command for navigating in the graphical interface GUI.

In step 507, the gesture-recognition device 110 goes into an error state, since the gesture executed by the user is not recognized. The gesture recognition device 110 may either do nothing or provide the user with a visual or audible feedback representing a failure of the gesture recognition, thus prompting him/her to repeat his gesture.

The invention claimed is:

1. A gesture-recognition method for recognizing gestures in the context of user interface control, said method being implemented by a gesture-recognition device, the method comprising:
   receiving gyroscopic data representing a gesture executed with a dedicated instrument comprising a gyroscopic sensor, wherein the gesture recognition device includes a network of artificial neurons comprising output neurons associated respectively with the gestures that said device is adapted for recognizing;
   determining, by the network of artificial neurons, a correlation between the received gyroscopic data and gyroscopic data relating to a supervised learning and pre-recorded in a database, the network of artificial neurons implementing an activation function of the sigmoid type and, for the received gyroscopic data and for each output neuron, supplying a probability that said received gyroscopic data correspond to the gesture associated with said output neuron;
   recognizing or not the executed gesture according to said correlation, the only data representing the executed gesture taken into account being said gyroscopic data;
   transposing each recognized gesture into a user interface command, and
   wherein, after receiving the gyroscopic data but prior to the determination of the correlation, performing a sampling operation by equally distributed deletion or equally distributed preservation of gyroscopic data among the received gyroscopic data so that only a number of gyroscopic data equal to a number of input neurons of the network of artificial neurons is obtained;
   wherein, the gyroscopic data received represent measurements made by the gyroscopic sensor on three axes of an inertial reference frame, said gesture-recognition method further comprising normalizing the received gyroscopic data so that for each original gyroscopic data item defined with respect to a given axis, the normalized gyroscopic data item is equal to a first value divided by a second value, where the first value is said original gyroscopic data item minus a minimum value of all the original gyroscopic data defined with respect to said given axis.

2. The gesture-recognition method according to claim 1, wherein, the received gyroscopic data representing measurements made by the gyroscopic sensor between two actions detected on a button of said dedicated instrument, receiving the gyroscopic-data is followed by deleting a predefined number of gyroscopic data from the start of the measurements and/or a predefined number of gyroscopic data to the end of the measurements.

3. The gesture-recognition method according to claim 1, wherein the gyroscopic data relating to the supervised learning and pre-recorded in the database correspond to all the following gestures:
   an horizontal gesture to the right (401);
   an horizontal gesture to the left (402);
   a vertical gesture upwards (403); and
   a vertical gesture downwards (404).

4. The gesture-recognition method according to claim 3, wherein the second value is a maximum value of all the original gyroscopic data defined with respect to said given axis minus the minimum value of all the original gyroscopic data defined with respect to said given axis.

5. The gesture-recognition method according to claim 3, wherein set of gestures further comprises:
   a gesture corresponding to the reproduction of the letter "V"; and
   a circular gesture starting from a high position and beginning the rotation towards the left.

6. The gesture-recognition method according to claim 5, wherein, the received gyroscopic data representing measurements made by the gyroscopic sensor on three axes of an inertial reference frame, said gesture-recognition method comprises normalizing the received gyroscopic received so that:
   for each original gyroscopic data item defined with respect to a given axis, the normalized gyroscopic data item is equal to said original gyroscopic data item minus the minimum value of all the original gyroscopic data defined with respect to said given axis, the whole divided by the minimum value of all the original gyroscopic data defined with respect to said given axis minus the mean of all the original gyroscopic data defined with respect to said given axis, the whole divided by the standard deviation of all the original gyroscopic data defined with respect to said given axis.

7. A gesture-recognition device configured for receiving gyroscopic data representing a gesture executed with a dedicated instrument comprising a gyroscopic sensor, wherein said gesture-recognition device comprises:
a network of artificial neurons comprising output neurons associated respectively with the gestures that said device is adapted for recognizing; and
circuitry adapted for:
due to the network of artificial neurons, determining a correlation between the gyroscopic data received and gyroscopic data relating to a supervised learning and pre-recorded in a database, the network of artificial neurons being adapted for implementing an activation function of the sigmoid type and, for the gyroscopic data received and for each output neuron, supplying a probability that said received gyroscopic data correspond to the gesture associated with said output neuron;
recognizing or not the executed gesture according to said correlation, the only data representing the executed gesture taken into account being said gyroscopic data;
transposing each recognized gesture into a user interface command; and
wherein, after receiving the gyroscopic data but prior to the determination of the correlation, performing a sampling operation by equally distributed deletion or equally distributed preservation of gyroscopic data among the received gyroscopic data so that only a number of gyroscopic data equal to a number of input neurons of the network of artificial neurons is obtained, wherein, the gyroscopic data received represent measurements made by the gyroscopic sensor on three axes of an inertial reference frame, said circuitry is further adapted for normalizing the received gyroscopic data so that for each original gyroscopic data item defined with respect to a given axis, the normalized gyroscopic data item is equal to a first value divided by a second value, where the first value is said original gyroscopic data item minus a minimum value of all the original gyroscopic data defined with respect to said given axis.

8. The gesture-recognition device according to claim 7, wherein the second value is a maximum value of all the original gyroscopic data defined with respect to said given axis minus the minimum value of all the original gyroscopic data defined with respect to said given axis.

9. A non-transitory information storage medium storing a computer program comprising program code instructions that are configured to be loaded in a programmable device to cause said programmable device to implement the method according to claim 1, when the program code instructions are run by the programmable device.

* * * * *